(12) United States Patent
Phillips

(10) Patent No.: US 8,371,981 B2
(45) Date of Patent: Feb. 12, 2013

(54) MULTI-SPEED TRANSMISSION HAVING TWO PLANETARY GEAR SETS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 12/757,890

(22) Filed: Apr. 9, 2010

(65) Prior Publication Data
US 2011/0251013 A1    Oct. 13, 2011

(51) Int. Cl.
*F16H 3/62*     (2006.01)

(52) U.S. Cl. .................................... 475/275; 475/284

(58) Field of Classification Search ............... 475/275, 475/284
See application file for complete search history.

(56) References Cited

U.S. PATENT DOCUMENTS 7,175,561 B2 *   2/2007   Usoro et al. ............... 475/275

* cited by examiner

*Primary Examiner* — Edwin A Young

(57) ABSTRACT

A transmission has an input member, an output member, two planetary gear sets, a plurality of coupling members and a plurality of torque transmitting devices. One of the planetary gear sets includes a first, second, third and fourth member and the other of the planetary gear sets includes a first, second and third member. The torque transmitting devices include clutches and brakes.

20 Claims, 2 Drawing Sheets

| GEAR STATE | GEAR RATIO | RATIO STEP | TORQUE TRANSMITTING ELEMENTS ||||| 
|---|---|---|---|---|---|---|---|
| | | | 30 | 26 | 28 | 32 | 34 |
| REV | -3.981 | | X | X | | | |
| N | | -0.82 | | | | | |
| 1ST | 4.880 | | X | | X | | |
| 2ND | 3.101 | 1.57 | X | | | X | |
| 3RD | 1.925 | 1.61 | | | X | X | |
| 4TH | 1.425 | 1.35 | | X | | X | |
| 5TH | 1.000 | 1.42 | | X | X | | |
| 6TH | | | | X | | | X |

X = ON - ENGAGED CARRYING TORQUE
O = ON - ENGAGED NOT CARRYING TORQUE

FIG. 3

MULTI-SPEED TRANSMISSION HAVING TWO PLANETARY GEAR SETS

FIELD

The invention relates generally to a multiple speed transmission having a plurality of planetary gear sets and a plurality of torque transmitting devices and more particularly to a transmission having five or more speeds, two planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, two planetary gear sets, a plurality of coupling members and a plurality of torque transmitting devices. The torque transmitting devices are for example clutches and brakes.

In an aspect of the present invention, the first planetary gear set has a first and second sun gear, a carrier member and a ring gear. The second planetary gear set has a sun gear, a carrier member and a ring gear.

The input member is continuously interconnected to the sun gear of the second planetary gear set and the output member is continuously interconnected to the carrier member of the second planetary gear set. The second member of the first planetary gear set is a carrier member that rotatably supports a plurality of planet gears. The planet gears have a first end that intermeshes with the first sun gear and the ring gear of the first planetary gear set and a second end that intermeshes with the second sun gear of the first planetary gear set. Further, an interconnecting member continuously interconnects the second sun gear of the first planetary gear set with the ring gear of the second planetary gear set. Additionally, a first torque transmitting mechanism is selectively engageable to interconnect the ring gear of the first planetary gear set with the sun gear of the second planetary gear set and the input member. A second torque transmitting mechanism is selectively engageable to interconnect the ring gear of the first planetary gear set with the carrier member of the second planetary gear set and the output member. A third torque transmitting mechanism is selectively engageable to interconnect the carrier member of the first planetary gear set with a stationary member. A fourth torque transmitting mechanism selectively engageable to interconnect the first sun gear of the first planetary gear set with the stationary member. The torque transmitting mechanisms are selectively engageable in combinations of at least two to establish at least five forward speed ratios and at least one reverse speed ratio between the input member and the output member.

In another embodiment of the present invention, a fifth torque transmitting mechanism is provided that is selectively engageable to interconnect the carrier member of the first planetary gear set with the sun gear of the second planetary gear set and the input member to produce a sixth gear ratio.

Thus, it is a feature of the present invention to provide a transmission having at least five forward speeds and at least one reverse.

It is further a feature of the present invention to provide a transmission having two planetary gear sets, a plurality of coupling members and a plurality of torque transmitting devices.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

Figure 1:
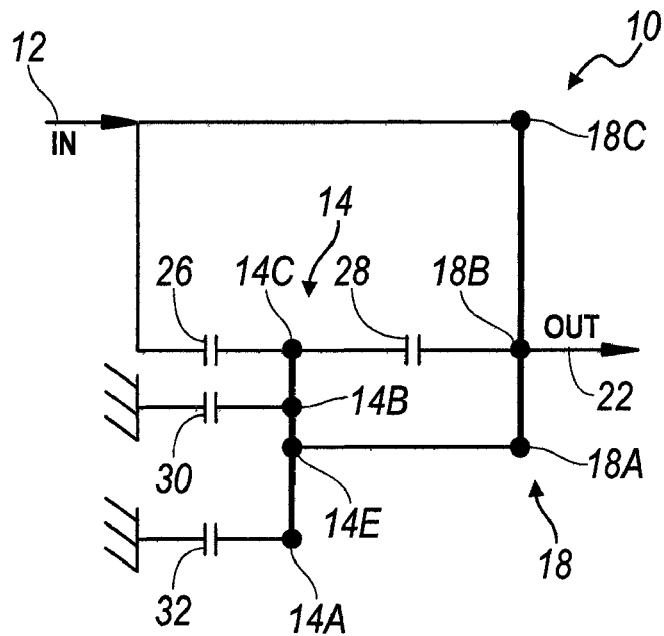
FIG. 1 is a lever diagram of an embodiment of a five speed transmission according to the present invention.

Referring now to FIG. 1, an embodiment of a five speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 18 and an output shaft or member 22. In the lever diagram of FIG. 1, the first planetary gear set 14 is a four node lever having: a first node 14A, a second node 14B, a third node 14C and a fourth node 14E. The lever of the third planetary gear set 18 has three nodes: a first node 18A, a second node 18B and a third node 18C.

The input member 12 is continuously coupled to the third node 18C of the third planetary gear set 18. The output member 22 is continuously coupled to the second node 18B of the third planetary gear set 18. The fourth node 14E of the first planetary gear set 14 is coupled to the first node 18A of the third planetary gear set 18.

A first clutch 26 selectively connects the third node 18C of the third planetary gear set 18 and the input member or shaft 12 with the third node 14C of the first planetary gear set 14. A second clutch 28 selectively connects third node 14C of the first planetary gear set 14 with the second node 18B of the third planetary gear set 18. A first brake 30 selectively connects the second node 14B of the first planetary gear set 14 with a stationary member or transmission housing 50. A second brake 32 selectively connects the first node 14A of the first planetary gear set 14 with a stationary member or transmission housing 50.

Figure 2:
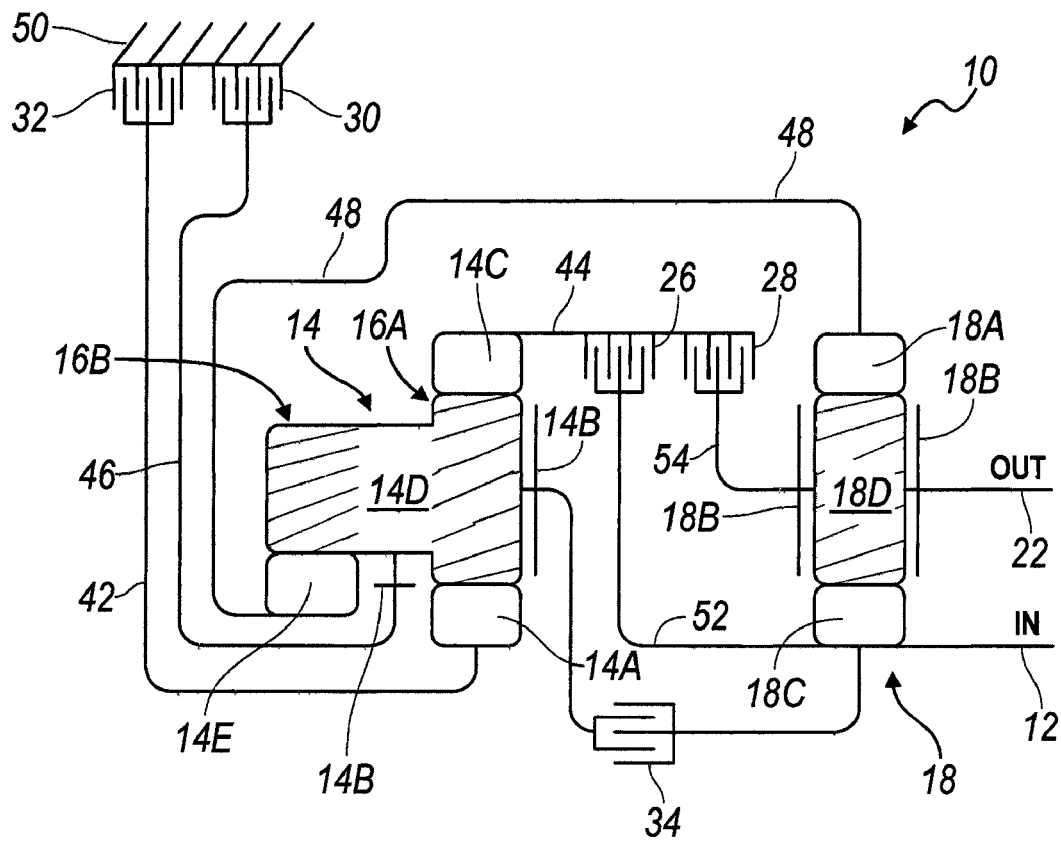
FIG. 2 is a diagrammatic illustration of an embodiment of a five speed transmission according to the present invention.

Referring now to FIG. 2, a stick diagram presents a schematic layout of the embodiment of the five speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes two sun gear members 14A and 14E, a ring gear member 14C and a planet gear carrier member 14B that rotatably supports a set of planet gears 14D (only one of which is shown). The first sun gear member 14A is connected for common rotation with a first shaft or interconnecting member 42. The ring gear member 14C is connected for common rotation with a second shaft or interconnecting member 44. The planet carrier member 14B is connected for common rotation with a third shaft or interconnecting member 46. The second sun gear member 14E is connected for common rotation with a fourth shaft or interconnecting member 48. The planet gears 14D are each configured as long stepped pinions having a first end 16A and a second end 16B.

In an embodiment of the present invention, the first end 16A of planet gears 14D have a larger diameter that transitions to the second end 16B having a smaller diameter than the first end 16A. The first end 16A of planet gears 14D intermesh with both the first sun gear member 14A of the first planetary gear set 14 and the ring gear member 14C of the first planetary gear set 14. The second end 16B of planet gears 14D intermesh with only the second sun gear member 14E of the first planetary gear set 14.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a fifth shaft or interconnecting member 52 and with the input member or shaft 12. The ring gear member 18A is connected for common rotation with the fourth shaft or interconnecting member 48. The planet carrier member 18B is connected for common rotation with a sixth shaft or interconnecting member 54 and with output member or shaft 22. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and brakes 30, 32 allow for selective interconnection of the shafts or interconnecting members, members of the planetary gear sets and the housing. For example, the first clutch 26 is selectively engageable to connect the second shaft or interconnecting member 44 with the fifth shaft or interconnecting member 52. The second clutch 28 is selectively engageable to connect the second shaft or interconnecting member 44 with the sixth shaft or interconnecting member 54. The first brake 30 is selectively engageable to connect the third shaft or interconnecting member 46 with the stationary element or the transmission housing 50 in order to restrict the member 46 from rotating relative to the transmission housing 50. The second brake 32 is selectively engageable to connect the first shaft or interconnecting member 42 with the stationary element or the transmission housing 50 in order to restrict the member 42 from rotating relative to the transmission housing 50.

As shown in FIG. 2, the second sun gear member 14E, the first sun gear 14A and the ring gear 14C all intermesh with the long stepped pinion 14D supported by carried member 14B of the first planetary gear set 14. The second sun gear member 14E in combination with either the first sun gear 14A or the ring gear 14C acting through the planet carrier member 14B effectively forms a third planetary gear set.

Referring now to FIG. 2 and FIG. 3, the operation of the embodiment of the five speed transmission 10 will be described. It will be appreciated that transmission 10 is capable of transmitting torque from the input shaft or member 12 to the output shaft or member 22 in at least five forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30 and second brake 32), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26 and first brake 30 are engaged or activated. The first clutch 26 connects the second shaft or interconnecting member 44 with the fifth shaft or interconnecting member 52. The first brake 30 connects the third shaft or interconnecting member 46 with the stationary element or the transmission housing 50 in order to restrict the member 46 from rotating relative to the transmission housing 50. Likewise, the five forward ratios are achieved through different combinations of clutch and brake engagement, as shown in FIG. 3.

It will be appreciated that the foregoing explanation of operation and gear states of the five speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In another embodiment of the present invention, a six speed transmission is provided by the addition of a fifth torque transmitting element or third clutch 34. As shown in FIG. 2, the third clutch 34 connects the second member or carrier member 14B of the first planetary gear set 14 with the sun gear of the second planetary gear set 18 and the input member 12. The second member or carrier member 14B of the first planetary gear set 14, as described above, rotatably supports a long stepped pinion 14D that intermeshes with the second the first sun gear 14A, sun gear member 14E and the ring gear 14C.

The description of the invention is merely exemplary in nature and variations that do not depart from the essence of the invention are intended to be within the scope of the invention. Such variations are not to be regarded as a departure from the spirit and scope of the invention.

The invention claimed is:

1. A transmission comprising:
an input member;
an output member;
a first planetary gear set having a first member, a second member, a third member and a fourth member;
a second planetary gear set having a first, a second and a third member, wherein the input member is directly connected for common rotation with one of the first, the second, the third, and the fourth members of one of the first and the second planetary gear sets;
an interconnecting member continuously interconnecting the fourth member of the first planetary gear set with the first member of the second planetary gear set; and
at least four torque transmitting mechanisms selectively engageable to interconnect at least one of the first, second, third and fourth members of the first planetary gear set and the at least one of the first, second and third members of the second planetary gear set with another of first, second, third and fourth members of the first planetary gear set, another of the first, second and third members of the second planetary gear set and a stationary member, and
wherein the at least four torque transmitting mechanisms are selectively engageable in combinations of at least two to establish at least five forward speed ratios and at least one reverse speed ratio between the input member and the output member.

2. The transmission of claim 1 wherein a first of the at least four torque transmitting mechanisms is selectively engageable to interconnect the third member of the first planetary gear set with the third member of the second planetary gear set and the input member.

3. The transmission of claim 2 wherein a second of the at least four torque transmitting mechanisms is selectively engageable to interconnect the third member of the first planetary gear set with the second member of the second planetary gear set and the output member.

4. The transmission of claim 3 wherein a third of the at least four torque transmitting mechanisms is selectively engageable to interconnect the second member of the first planetary gear set with the stationary member.

5. The transmission of claim 4 wherein a fourth of the at least four torque transmitting mechanisms is selectively engageable to interconnect the first member of the first planetary gear set with the stationary member.

6. The transmission of claim 5 further comprising a fifth torque transmitting mechanism that is selectively engageable to interconnect the second member of the first planetary gear set with the third member of the second planetary gear set and the input member.

7. The transmission of claim 1 wherein two of the at least four torque transmitting mechanisms are brakes for connecting at least one of the members of the first and second planetary gear sets to the stationary member and two of the at least four torque transmitting mechanisms are clutches for connecting at least one other of the members of the first and second planetary gear sets to at least one other member of the first and second planetary gear sets.

8. The transmission of claim 1 wherein the first and the fourth members of the first planetary gear set are a first and second sun gear and the third member of the second planetary gear set is a sun gear, the second members of the first and second planetary gear sets are carrier members and the third member of the first planetary gear set and the first member of the second planetary gear set are ring gears.

9. The transmission of claim 8 wherein the carrier member of the first planetary gear set rotatably supports a plurality of planet gears, wherein the planet gears have a first end that intermeshes with the first sun and ring gears of the first planetary gear set and a second end that intermeshes with the second sun gear of the first planetary gear set.

10. The transmission of claim 9 wherein the plurality of planet gears are rotatably supported by a carrier member of the first planetary gear set and are stepped pinion gears having a first end that is larger than a second end.

11. A transmission comprising:
an input member;
an output member;
a first planetary gear set having a first member, a second member, a third member and a fourth member;
a second planetary gear set having a first, a second and a third member;
an interconnecting member continuously interconnecting the fourth member of the first planetary gear set with the first member of the second planetary gear set; and
a first torque transmitting mechanism selectively engageable to interconnect the third member of the first planetary gear set with the third member of the second planetary gear set and the input member;
a second torque transmitting mechanism selectively engageable to interconnect the third member of the first planetary gear set with the second member of the second planetary gear set and the output member;
a third torque transmitting mechanism selectively engageable to interconnect the second member of the first planetary gear set with a stationary member;
a fourth torque transmitting mechanism selectively engageable to interconnect the first member of the first planetary gear set with the stationary member; and
a fifth torque transmitting mechanism selectively engageable to interconnect the second member of the first planetary gear set with the third member of the second planetary gear set and the input member, and wherein the torque transmitting mechanisms are selectively engageable in combinations of at least two to establish at least six forward speed ratios and at least one reverse speed ratio between the input member and the output member.

12. The transmission of claim 11 wherein the first and the fourth members of the first planetary gear set are a first and second sun gear and the third member of the second planetary gear set is a sun gear, the second members of the first and second planetary gear sets are carrier members and the third member of the first planetary gear set and the first member of the second planetary gear set are ring gears.

13. The transmission of claim 12 wherein the carrier member of the first planetary gear set rotatably supports a plurality of planet gears, wherein the planet gears have a first end that intermeshes with the first sun and ring gears of the first planetary gear set and a second end that intermeshes with the second sun gear of the first planetary gear set.

14. The transmission of claim 13 wherein the plurality of planet gears rotatably supported by the carrier member of the first planetary gear set are stepped pinion gears having a first end that is larger than a second end.

15. The transmission of claim 11 wherein the fifth torque transmitting mechanism is selectively engageable to interconnect the second member of the first planetary gear set with the third member of the second planetary gear set and the input member to produce a sixth gear ratio.

16. A transmission comprising:
an input member;
an output member;
a first planetary gear set having a first member, a second member, a third member and a fourth member;
a second planetary gear set having a first, a second and a third member;
an interconnecting member continuously interconnecting the fourth member of the first planetary gear set with the first member of the second planetary gear set; and
a first torque transmitting mechanism selectively engageable to interconnect the third member of the first planetary gear set with the third member of the second planetary gear set and the input member;
a second torque transmitting mechanism selectively engageable to interconnect the third member of the first planetary gear set with the second member of the second planetary gear set and the output member;
a third torque transmitting mechanism selectively engageable to interconnect the second member of the first planetary gear set with a stationary member;
a fourth torque transmitting mechanism selectively engageable to interconnect the first member of the first planetary gear set with the stationary member, and
wherein the torque transmitting mechanisms are selectively engageable in combinations of at least two to establish at least five forward speed ratios and at least one reverse speed ratio between the input member and the output member.

17. The transmission of claim 16 wherein the first and the fourth members of the first planetary gear set are a first and second sun gear and the third member of the second planetary gear set is a sun gear, the second members of the first and second planetary gear sets are carrier members and the third member of the first planetary gear set and the first member of the second planetary gear set are ring gears.

18. The transmission of claim 17 further comprising a fifth torque transmitting mechanism that is selectively engageable to interconnect the carrier member of the first planetary gear set with the sun gear of the second planetary gear set and the input member to produce a sixth gear ratio.

19. The transmission of claim 17 wherein the carrier member of the first planetary gear set rotatably supports a plurality of planet gears, wherein the planet gears have a first end that intermeshes with the first sun and ring gears of the first planetary gear set and a second end that intermeshes with the second sun gear of the first planetary gear set.

20. The transmission of claim 19 wherein the plurality of planet gears rotatably supported by the carrier member of the first planetary gear set are stepped pinion gears having a first end that is larger than a second end.

* * * * *